No. 619,234. Patented Feb. 7, 1899.
A. SCHULZE.
ROLLER BALING PRESS.
(Application filed May 14, 1895.)

(No Model.) 5 Sheets—Sheet 1.

Fig. 1.

Witnesses
W. C. Alexander.
E. E. Vernell.

Inventor
Andrew Schulze
By Attorneys
Fowler & Fowler

No. 619,234. Patented Feb. 7, 1899.
A. SCHULZE.
ROLLER BALING PRESS.
(Application filed May 14, 1895.)
(No Model.) 5 Sheets—Sheet 2.

Witnesses
W. A. Alexander.
E. E. Vernell.

Inventor
Andrew Schulze
By Attorneys
Fowler & Fowler

No. 619,234. Patented Feb. 7, 1899.
A. SCHULZE.
ROLLER BALING PRESS.
(Application filed May 14, 1895.)

(No Model.) 5 Sheets—Sheet 3.

Witnesses
W. C. Alexander
E. E. Vernell.

Inventor
Andrew Schulze

By Attorneys
Fowler & Fowler

No. 619,234. Patented Feb. 7, 1899.
A. SCHULZE.
ROLLER BALING PRESS.
(Application filed May 14, 1895.)
(No Model.) 5 Sheets—Sheet 4.

Witnesses
W. C. Alexander.
E. E. Vernell

Inventor
Andrew Schulze
By Attorneys
Thoder & Thoder

UNITED STATES PATENT OFFICE.

ANDREW SCHULZE, OF ST. LOUIS, MISSOURI, ASSIGNOR TO THE KINGSLAND & DOUGLAS MANUFACTURING COMPANY, OF SAME PLACE.

ROLLER BALING-PRESS.

SPECIFICATION forming part of Letters Patent No. 619,234, dated February 7, 1899.

Application filed May 14, 1895. Serial No. 549,273. (No model.)

*To all whom it may concern:*

Be it known that I, ANDREW SCHULZE, a citizen of the United States, residing at the city of St. Louis, in the State of Missouri, have invented a certain new and useful Roller Baling-Press, of which the following is such a full, clear, and exact description as will enable any one skilled in the art to which it appertains to make and use the same, reference being had to the accompanying drawings, forming part of this specification.

My invention relates to a new and useful baling-press, and pertains more particularly to that class of baling-presses in which the cotton or other material to be compressed is formed into a compact cylindrical bale by winding a thin lamina or bat of said material around a spindle or core and simultaneously applying pressure thereto by one or more rollers.

The object of my invention is to provide a press of this class in which the process of baling is practically continuous, thus obviating the use of two presses when the cotton is received directly from the condenser or making the press do the work of two presses of the ordinary construction.

My invention also has for its object to provide means for covering the finished bale.

My invention consists in part in providing two presser-rollers and mechanism for moving the bale around a main roller from one of said presser-rollers to the other, in providing mechanism for winding a strip of bagging or similar material around the finished bale and simultaneously feeding it along said bale, and in other novel features and details, all of which are described in the following specification and pointed out in the claims.

In the accompanying drawings, which illustrate one form of a roller baling-press embodying my invention.

Like marks of reference refer to similar parts in all the views of the drawings.

Figure 7:
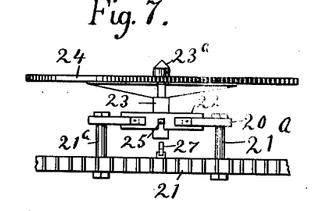
Fig. 7, a top view of one of the end baling-plates and devices carrying the same.
Figure 8:
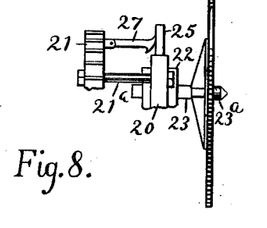
Fig. 8, a side view of the same.

15 is a base or foundation, preferably of brick or stone work, upon which are secured two triangular side frames 16. For convenience in construction these frames are preferably composed of three parts bolted together, forming a triangle. In the top of these triangular frames 16 is journaled a shaft 17, on which an upper main roller 18 is rigidly mounted. On the shaft 17, at each side of the main roller 18, is loosely mounted a spider 19, to the arms 20 of each of which is bolted a toothed ring 21. Sleeves 21ª, Figs. 2, 7, and 8, are placed around the bolts connecting the arms 20 and rings 21 to hold said parts some distance from each other. In said arms 20 are formed slots, in which slide boxes 22, through which boxes pass short bars 23, Fig. 7, having a reduced portion, on which end baling-plates 24 are loosely mounted. Said bars 23 have pointed projecting ends or bosses 23ª. Through the short bars 23 pass bars 25, Figs. 7 and 8, which are pivoted at their inner ends at 25ª, Fig. 1, to the spiders 19. By drawing these bars 25 toward the toothed rings 21 the end baling-plates 24 can be forced apart to release the bale cores or spindles. To hold the end baling-plates 24 in position and thereby secure the bale-cores in place, the cam-levers 27 are thrown inwardly against the bars 25. To the outer faces of the toothed rings 21 are secured at regular intervals notched blocks 28, Figs. 1 and 12, adapted to engage with a spring-detent 29, secured to one of the frames 16, and thus hold the toothed rings 21 and spiders 19, attached thereto, in the required position. The spring-detent 29 is connected by a suitable rod 29ª, Figs. 1 and 12, to a hand-lever 30, pivoted at any convenient point of the frame 16. By means of this hand-lever 30 the spring-detent 29 can be disengaged from notched blocks 28 and the toothed rings 21 thus allowed to rotate. The toothed rings 21 are driven by two toothed gear-wheels 31, Figs. 1 and 2. These wheels 31 are rigidly secured to a common shaft 31ª, Figs. 1 and 12, so that one of the toothed rings 21 cannot move independently of the other and are both driven thereby. The shaft 31ª may be driven intermittently or when required in any suitable way.

Figure 1:
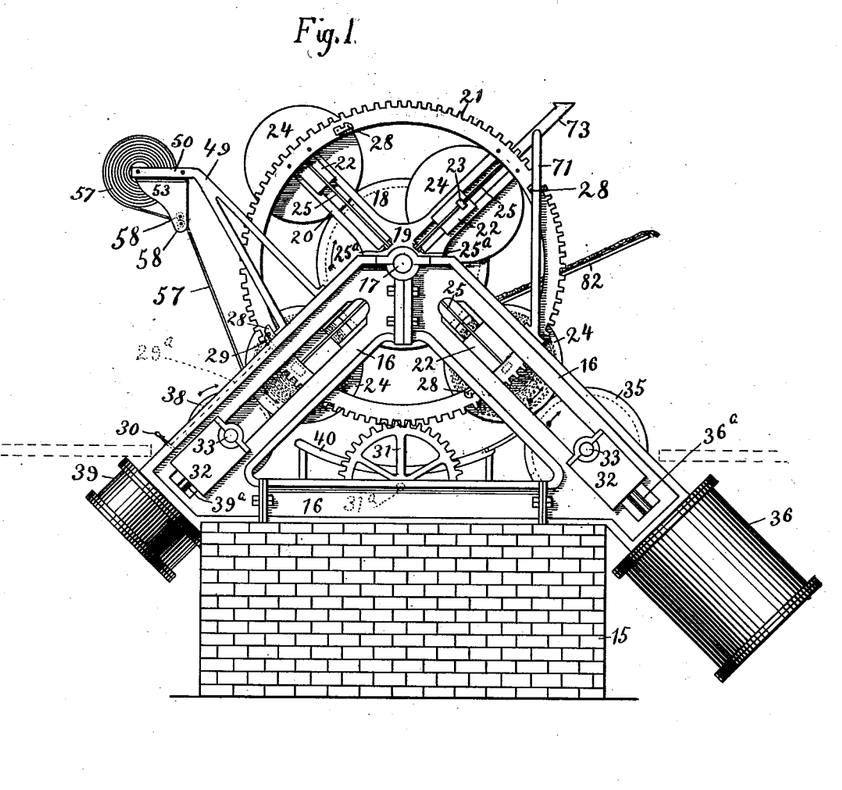
Figure 1 is an end elevation thereof.
Figure 2:
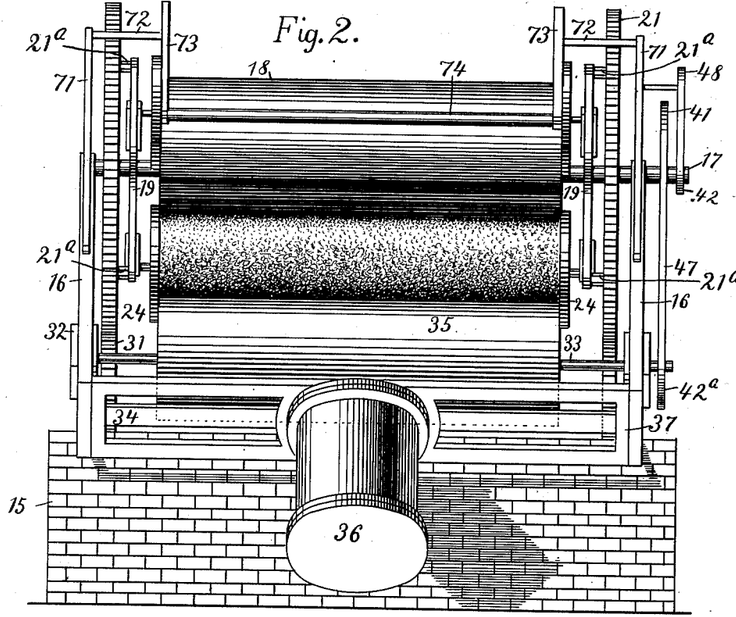
Fig. 2, a side elevation looking from the right hand of Fig. 1.
Figure 3:
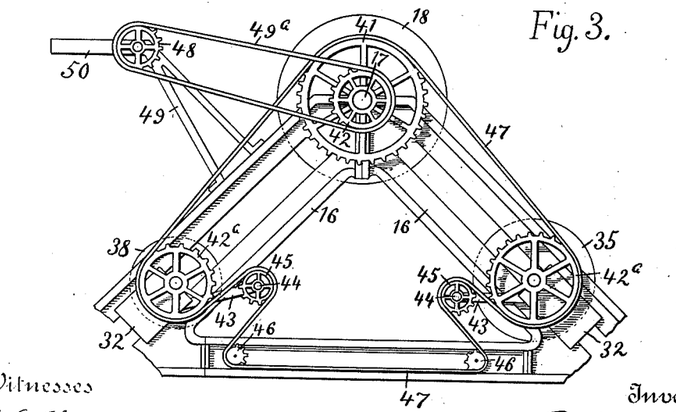
Fig. 3, an end elevation of the gearing and frame carrying the same.
Figure 12:
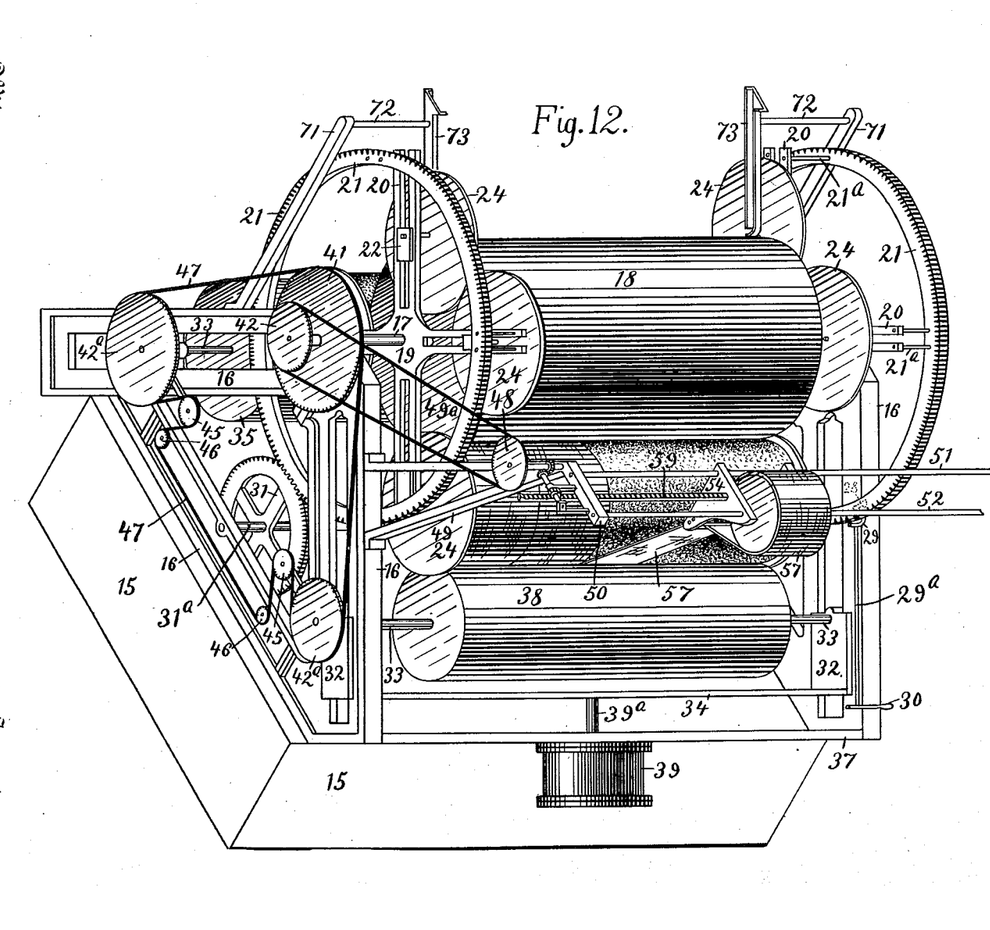
Fig. 12, an isometric projection of the complete press, looking at the opposite side from Fig. 2.
Figure 13:
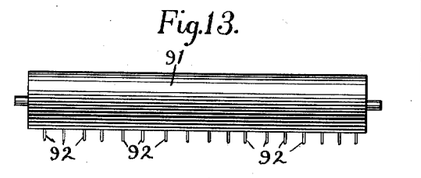
Fig. 13, a detail view of the storage-roller, and Fig. 14 a detail view showing the method of journaling the storage-roller.
Figure 14:
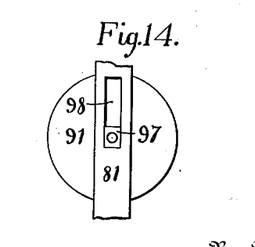

In each of the main side frames 16 are formed two slots, in which slide boxes 32, Figs. 1, 3, and 12. Each corresponding pair of boxes 32 have mounted in them a shaft 33 and are connected by a bar 34, Figs. 2 and 12. On the shaft 33, at the side of the machine to which the cotton is fed, is rigidly mounted a lower movable roller 35, to which pressure is applied by means of a fluid-pressure cylinder 36, secured to a frame 37, Fig. 2, connecting the main side frames 16, the piston-rod of said cylinder being connected to the bar 34. On the shaft 33, at the opposite side of the machine, is rigidly mounted a lower movable roller 38, preferably smaller than the roller 35. Pressure is supplied to said roller 38 by a fluid-pressure cylinder 39 and piston-rod 39ª in the same manner as described in connection with the roller 35. This cylinder 39 is preferably shorter than the cylinder 36. Between the frames 16 is a curved plate 40, Fig. 1, supported by the base of the press, upon which curved plate the bale rolls in passing from the lower movable roller 35 to the lower movable roller 38, said bale being carried forward by the toothed ring 21.

The gearing for driving the rollers and bale-covering device is illustrated more particularly in Fig. 3. The shaft 17 of the main roller 18 is extended at one end of the machine, and upon it are secured sprocket-wheels 41 and 42, Figs. 2, 3, and 12. The shafts 33 of the lower movable rollers are extended at the same end of the machine, and on them are secured sprocket-wheels 42ª. To the boxes 32 are secured arms 43, carrying studs 44, on which are mounted sprocket-wheels 45. On the lower part of the frame 16, at the same side of the press as the gear-wheels last described, are secured two sprocket-wheels 46, to one of which the power for driving the press may be applied. Around the sprocket-wheels 41, 42ª, 45, and 46 passes an endless sprocket-chain 47. The sprocket-wheels 41 and 42ª are of such size that the peripheral speed of the upper main roller 18 on the shaft 17 and the lower movable rollers 35 and 38 will be the same. As the lower movable rollers 35 and 38 move toward the upper roller 18 the slack in the sprocket-chain 47 is taken up by the sprocket-wheels 45, the strands of chain between the wheels 46 and 44 lengthening as that between the wheels 42ª and 41 shortens, and vice versa. Passing around the sprocket-wheel 42 and a sprocket-wheel 48, secured by a stud to a frame 49, Figs. 1, 3, and 12, carrying the bagging or bale-covering apparatus, is an endless sprocket-chain 49ª. There are two frames 49, one secured at each end of the press to each of the main side frames 16. The bagging or bale-covering apparatus is driven from the sprocket-wheel 48 in the manner hereinafter described.

Figure 4:
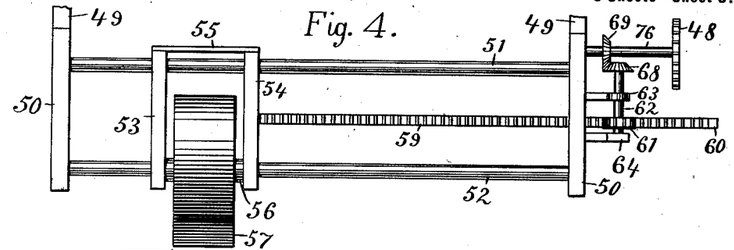
Fig. 4, a top plan view of the bale-covering apparatus.
Figure 5:
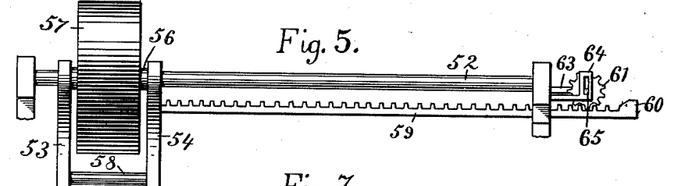
Fig. 5, a front elevation of the same.
Figure 6:
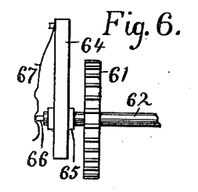
Fig. 6, an enlarged view of the pinion-wheel shown in Figs. 4 and 5 and the bracket carrying the same.

The apparatus for applying the bagging or covering to the bale is best understood by reference to Figs. 4, 5, and 12. To the extensions 50 on the frames 49 are secured two turned rods 51 and 52. On these rods slide a frame composed of two side pieces 53 and 54, secured together by a plate 55. On the rod 52 and between the side pieces 53 and 54 is placed a hollow cylinder or collar 56, upon which the roll of bagging 57, Figs. 1, 4, 5, and 12, is wound. At the lower ends of the side pieces 53 and 54 are placed two rollers 58, Figs. 1 and 5, between which the bagging passes to keep it taut as it passes to the bale. To the side piece 54 is secured a toothed rack 59, having at its outer end an upwardly-inclined portion 60. Engaging with the rack 59 is a toothed pinion-wheel 61, secured to a shaft 62, carried in brackets 63 and 64, said shaft 62 being journaled directly in the bracket 63 and in a box 65, Fig. 6, sliding in a slot in the bracket 64. The bracket 63 is pivotally attached to the extension 50, so that said bracket can turn for some distance, and thus allow the pinion-wheel 61 to be raised out of engagement with the rack 59. The end of the shaft 62, which is carried in the box 65, is provided with a boss 66, Fig. 6, adapted to engage with two indentations, one above the other, in a spring 67, secured to the bracket 64. Said indentations are so situated that when the boss 66 is in engagement with the lower one the pinion-wheel 61 is held in engagement with the rack 59 and when said boss is in engagement with the upper one the pinion-wheel is held above and out of engagement with said rack. On the end of the shaft 62 is secured a bevel gear-wheel 68, Fig. 4, which engages with a bevel gear-wheel 69, secured to a collar 76, placed around the stud carrying the sprocket-wheel 48 and secured to said wheel.

Figure 9:
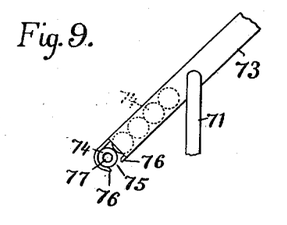
Fig. 9 is a side elevation of the device for feeding the bale cores or spindles between the end baling-plates.

The device for feeding the bale cores or spindles between the circular end baling-plates 24 is illustrated in Figs. 1, 2, and 12 and in detail in Fig. 9. Two standards 71 are secured to the side frames 16. On these standards 71 are lateral extensions 72, Figs. 2 and 12, to which are secured the bale-spindle holders 73, into which the end of the bale cores or spindles 74 are placed. A portion of the lower ends of the side pieces of the holders 73 are removed, leaving the ends of the lowest bale-core exposed, as shown in Fig. 9, so that the bosses 23ª of the circular end baling-plates 24 may engage with the ends of said core. Openings 75, slightly smaller than the diameter of the bale-cores, are made in the lower sides of the holders 73. The edges 76 of the bale-core holder which bound the openings are flexible, so that the bale-core can be drawn through said openings by the end baling-plates 24. In the ends of the bale-cores 74 are recesses 77, adapted to receive the bosses 23ª, Fig. 7, of the bars 23. These bale-spindle holders form a magazine for supplying the press with bale cores or spindles.

Figures 10, 11:
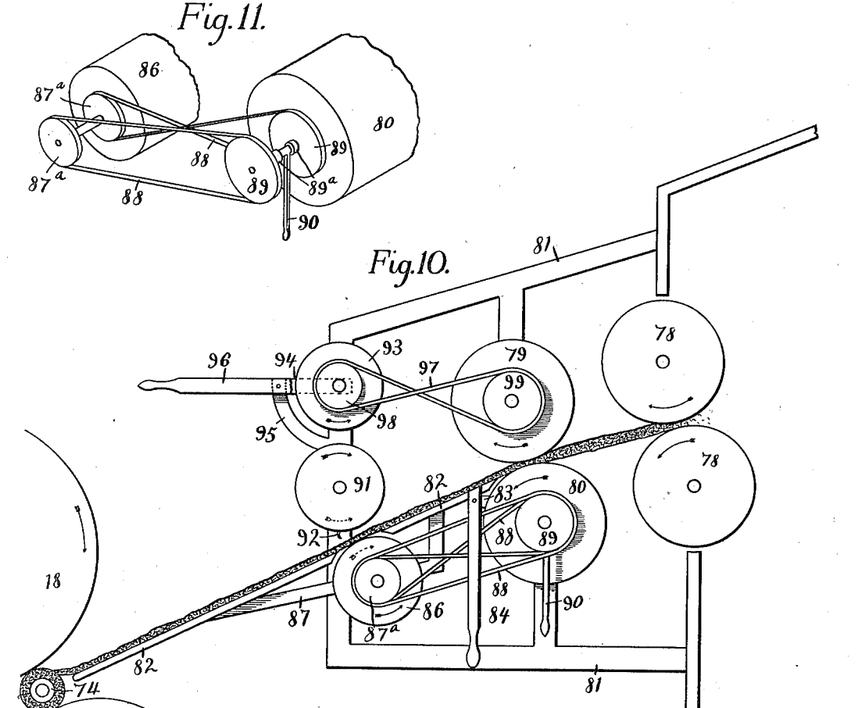
Fig. 10, a side elevation of the mechanism for feeding the cotton into the press and temporarily storing it when it becomes necessary to stop the press for any reason, one of the side frames thereof being removed to better show the construction.
Fig. 11, an isometric projection of a portion of the mechanism shown in Fig. 10.

Fig. 10 illustrates a device for temporarily storing the cotton while the press is stopped from any cause.

78 are the doffer-rollers at the rear of a condenser. From these doffer-rollers the cotton passes to compressing-rollers 79 and 80, carried in a frame 81, attached to the condenser or otherwise suitably supported. The compressing-rollers 79 and 80 are preferably driven from the doffer-rollers 78 in any suitable way. From the compressing-rollers 79 and 80 the cotton passes to a feed-board 82, pivotally secured to arms 83 on the side frames 81. The feed-board 82 is provided with a lever 84, by means of which its outer end can be raised some distance by swinging said board upon its pivots. Said board has an opening 85 across it, beneath which is a roller 86, carried in frames 87, secured to said board 82. The roller 86 is provided with two pulley-wheels 87ª, Figs. 10 and 11, around which pass belts 88 (one of which is crossed) to the clutch-wheels 89, Fig. 11, on the roller 80. The clutch-pulleys 89 are provided with a friction-clutch 89ª and a shift-lever 90, by means of which either pulley 89 can be thrown into work with the roller 86, and thus the roller 86 rotated in either direction, as desired. Above the roller 86 is a storage-roller 91, journaled in boxes 97, which slide in slots 98 in the side frames 81, and thus allow the roller 91 to rise as the cotton is wound around it. This roller 91 is provided with a row of bent teeth or hooks 92. Above the roller 91 is a roller 93, journaled in a frame 94, pivoted to extensions 95 on the frame 81. The frame 94 is provided with a hand-lever 96, by means of which it is raised and lowered. The roller 93 is driven by a belt 97, passing around a pulley 98 on said roller 93 and a pulley 99 on the roller 79. When it is desired to temporarily store the cotton, the shift-lever 90 is moved so that the roller 86 is rotated in the direction shown by the dotted arrows in Fig. 10. The feed-board 82 is then raised by means of the lever 84 until the cotton over the roller 86 is brought in contact with the roller 91, and said roller is driven in the direction shown by the dotted arrow by the contact of the roller 86 with the bat of cotton which is now pressed against the said roller 91. The bat of cotton is caught by the teeth 92 and wound around the roller 91. When it is desired to resume the operation of the press, the motion of the roller 86 is reversed and the feed-board 82 lowered. The roller 93 is then lowered into contact with the roller 91 by means of the lever 96, and thus drives said roller 91 in the opposite direction, as shown by the arrow in full lines, unwinding the cotton, which passes down the feed-board to the bale-spindle 74.

The parts being in the position shown in the drawings, the operation of my machine is as follows: The cotton is led down the feed-board 82 to a bale core or spindle 74, held by the end bale-plates 24 between the main roller 18 and the presser-roller 35. After the bale has reached the required size the detent 29, Figs. 1 and 12, is withdrawn from the notched block 28 and motion imparted to the toothed rings 21 by the toothed wheels 31 or in any other way. The formed bale between the rollers 18 and 35 is thus carried around the upper roller 18 until it is brought over the lower roller 38, in which position it is secured by the engagement of the spring-detent 29 with the next succeeding notched block 28. Here the bagging is applied while a new bale is being formed between the upper roller 18 and the lower movable roller 35. The fluid-pressure cylinders 36 and 39 permit the bale to increase in size while holding the presser-rollers up to their work against the bale. In transferring a bale from one roller to another or in removing a bale from the press the fluid-pressure cylinders are exhausted of their steam, allowing the lower rollers to recede from the bale.

To apply the bagging or covering to the bale, the frame in which the bagging is held is drawn close to the extension 50 of the frame 49 to which the gearing is secured. The end of the bagging is then secured to the bale and the pinion-wheel 61 drawn down into engagement with the toothed rack 59. The roll of bagging is thereby fed along the bale as the bagging is wrapped around it. When the roll of bagging has reached the end of the bale, the pinion-wheel 61 is raised out of engagement with the rack by the upwardly-inclined portion 60 of said rack and held in this position by the engagement of the boss 66 with the upper indentation in the spring 67, so that the roll of bagging can be returned to its former position by hand. After the bagging has been severed between the roll and bale and the free end thereof secured to the bale the bale may be removed from the press by swinging the cam-levers 27 outward and drawing outward the bars 25. The bale is thus liberated from the end baling-plates and being carried forward over the lower movable roller 38 will drop on the floor, which is preferably situated as shown by the broken lines in Fig. 1. These bars 25 are allowed to remain in this position until the bosses 23ª of the bars 23, upon which said end bale-plates 24 are mounted, come opposite the recesses 77 in the ends of the lowest bale-core 74 in the bale-spindle holder 73. The bars 25 are then pressed forward, causing said bosses 23ª to enter said recesses 77, and thus secure the bale-core between the plates. The cam-levers 27 are then swung inwardly against the bars 25 to secure them in position. When the toothed rings 21 are rotated, the lowest core 74 will be drawn through the opening 75 in holder 73.

I do not wish to limit my invention to the construction set forth, as many changes may be made therein without departing from my invention.

Many features of my invention are applicable to roller baling-presses generally and are not limited in their application to a duplex or multiplex roller baling-press, as herein specifically set forth.

The term "rotary members" used in the claims refers to the devices for positioning the bale-spindles between the rollers or transferring the bale and not to the bale end plates.

Having fully described my invention, what I claim as new, and desire to secure by Letters Patent of the United States, is—

1. In a baling-press, a set of rollers by which the baling is begun, and a second set of rollers to which the bale is transferred to render the process of baling substantially continuous.

2. In a baling-press, a set of rollers by which the baling is begun, a second set of rollers coöperating with said first set of rollers to render the process of baling substantially continuous, and means for transferring the bale from said first to said second set of rollers.

3. In a baling-press, a set of rollers by which the baling is begun, a second set of rollers to which the bale is transferred to render the process of baling substantially continuous, and means for applying bagging to the bale between said second set of rollers.

4. In a baling-press, a rigidly-journaled main roller, a movable roller between which and the main roller the bale is formed, and a second movable roller coöperating with the main roller, to which the bale is transferred for the purpose of applying the bagging.

5. In a roller baling-press, side frames, a main roller journaled in said side frames, and two movable rollers journaled in boxes sliding in said frames, one of which movable rollers forms the bale, and the other of which completes the bale by applying the bagging.

6. In a roller baling-press, side frames, a main upper roller rigidly journaled in said side frames, two movable rollers journaled in boxes sliding in said frames, one of which movable rollers forms the bale and the other of which completes the bale by applying the bagging, and a fluid-pressure cylinder below each movable roller keeping said movable rollers up to their work, but permitting them to move downward as the size of the bale increases.

7. In a baling-press, a roller rigidly journaled, a movable roller, the bale being formed between said rollers, sliding boxes for said movable roller, flexible gearing driving said fixed and movable rollers, a rigidly-journaled wheel driving said flexible gearing, and an idle-wheel carried by said sliding boxes, whereby the flexible gearing will be maintained taut as the sliding boxes rise and fall.

8. In a baling-press, side frames, a roller rigidly journaled therein, two movable rollers, by one of which movable rollers the bale is formed and by the other of which the bagging is applied to the bale, sliding boxes for the movable rollers, flexible gearing driving said rollers, two wheels rigidly journaled to the side frames, and wheels carried by said sliding boxes, over all of which wheels said flexible gearing passes.

9. In a baling-press, the combination of rollers between which the bale is formed, a rotary member at each end of said rollers, a series of bale-spindle-engaging devices carried by each of said rotary members, and a bale-spindle holder arranged adjacent to said rotary members, whereby the bale-spindles may be withdrawn from the holder and suitably positioned between the pressing-rollers.

10. In a baling-press, rollers between which the bale is formed, rollers between which the bale is completed by the application of the bagging, a rotary member at each end of said rollers, and bale-spindles carried by said rotary members, whereby the formed bale may be transferred from between one set of rollers to another and a second bale-spindle positioned between the preliminary pressing-rollers.

11. In a baling-press, rollers between which the bale is formed, rollers between which the bale is completed by the application of the bagging, a rotary member at each end of said rollers, bale-spindles carried by said rotary members, and devices locking and unlocking said rotary members, whereby the bales and bale-spindles may be held in position between the pressing-rollers and the formed bale transferred from between one set of rollers to another, and a second bale-spindle positioned between the preliminary pressing-rollers.

12. In a baling-press, rollers between which the bale is formed, rollers between which the bale is completed by the application of the bagging, a rotary member at each end of said rollers, bale-spindles carried by said rotary members, and power devices for intermittently rotating said rotary members to transfer the formed bales to the secondary rollers and position a second bale-spindle between the pressing-rollers.

13. In a baling-press, a main roller, two movable lower rollers, between one of which movable rollers and the main roller the bale is formed and between which other movable roller and the main roller the bale is completed by the application of the bagging, a rotary member at each end of said rollers, and a support for sustaining the formed bale when be- 14. In a baling-press, rollers between which the bale is formed, a rotary member at each end of said rollers, a multiple set of plates for the ends of the bale carried by said rotary members, guides or arms in said rotary members in which said end plates have radial motion toward and from the center of the press, and a bale-spindle holder arranged contiguous to the plane of movement of said end plates and presenting the bale-spindles to the end baling-plates, whereby the bale-spindles will be withdrawn from the holder and suitably positioned between the rollers to receive the cotton.

15. In a baling-press, rollers between which the bale is formed, a rotary member at each end of said rollers, a multiple set of plates for the ends of the bale carried by said rotary members, and guides in the rotary members in which said end plates have radial motion.

16. In a baling-press, a roller by which the bale is formed, another roller to which the bale may be transferred for the application of the bagging, a rotary member at each end of said rollers, plates for the ends of the bale carried by the said rotary members, and guides in which said end plates have radial motion.

17. In a baling-press, rollers between which the bale is formed, rollers between which the bale is completed by the application of the bagging, a rotary member at each end of said rollers, a series of plates for the ends of the bale carried by said rotary members, guides or arms in which said end plates have radial motion, and bale-spindles carried by said end plates, whereby the formed bales together with the end plates and bale-spindles may be transferred from between one set of rollers to another, and a second bale-spindle and its end plates positioned between the pressing-rollers.

18. In a baling-press, a main roller, two movable lower rollers, between one of which movable rollers and the main roller the bale is formed and between the other of which movable rollers the bale is completed by the application of the bagging, a rotary member at each end of said rollers, a series of plates for the ends of the bale carried by said rotary members, guides or arms in which said end plates having radial motion, and bale-spindles carried by said end plates, whereby the formed bale may be transferred from between one set of rollers to another, and a second bale-spindle positioned between the pressing-rollers.

19. In a baling-press, rollers between which the bale is formed, rollers between which the bale is completed by the application of the bagging, a rotary member at each end of said rollers, a series of plates for the ends of the bale carried by said rotary members, guides or arms in which said end plates have radial motion, bale-spindles carried by said end plates, and devices locking and unlocking said rotary members, whereby the bales may be held in position between the pressing-rollers and the formed bale transferred from between one set of rollers to another, and a second bale-spindle positioned between the pressing-rollers.

20. In a baling-press, rollers between which the bale is formed, rollers between which the bale is completed by the application of the bagging, a rotary member at each end of said rollers, a series of plates for the ends of the bale carried by said rotary members, guides or arms in which said end plates have radial motion, and power devices intermittently rotating said rotary members to transfer the formed bales to the secondary rollers and position a second bale-spindle for receiving a new bale.

21. In a baling-press, a main roller, two movable lower rollers, between one of which movable rollers and the main roller the bale is formed and between the other of which movable rollers and the main roller the bale is completed by the application of the bagging, a rotary member at each end of said rollers, a series of baling-plates for the ends of the bale carried by said rotary members, guides or arms in which said end plates have radial motion, bale-spindles carried by said end plates, and a support for sustaining the formed bale when being transferred from the pressing-roller to the secondary roller.

22. In a baling-press, a set of rollers by which the bale is formed, a rotary member at each end of said rollers, and a series of bale-spindle-engaging devices carried by each rotary member and having a movement longitudinal of the bale-spindle.

23. In a baling-press, a set of rollers by which the bale is formed, a rotary member at each end of said rollers, a series of bale-spindle-engaging devices carried by each of said rotary members, and having a movement longitudinal of the bale-spindle, and manually-operated appliances for holding the bale-spindle-engaging devices in position.

24. In a baling-press, a set of rollers by which the bale is formed, a rotary member at each end of said rollers, a series of bale-spindle-engaging devices carried by each of said rotary members, and having a movement longitudinal of the bale-spindle, and a bale-spindle holder arranged in the path of said bale-spindle-engaging devices, whereby a bale-spindle may be engaged by a pair of said bale-spindle-engaging devices while a bale is being formed by said rollers.

25. In a baling-press, a set of rollers by which the bale is formed, a rotary member at each side of said rollers, a series of bale-spindle-engaging devices carried by each of said rotary members and having a movement longitudinal of the bale-spindle, a bale-spindle holder arranged in the path of said bale-spindle-engaging devices, and manually-operated appliances holding the bale-spindle-engaging devices in position.

26. In a baling-press, a set of rollers by which the bale is formed, a rotary member at each end of said rollers, a series of plates for the ends of the bale carried by each of said rotary members, bale-spindle-engaging devices upon the end plates, said end plates and bale-spindle-engaging devices having a motion longitudinal of the bale-spindles.

27. In a baling-press, a roller by which the bale is formed, a rotary member at each end of said roller, a series of plates for the ends of the bale carried by each of said rotary members, bale-spindle-engaging devices upon said end plates, the end plates and bale-spindle-engaging devices having a motion longitudinal of the bale-spindles, and a bale-spindle holder arranged in the path of said bale-spindle-engaging devices, whereby a bale-spindle may be engaged by a pair of said bale-spindle-engaging devices while a bale is being formed by said rollers.

28. In baling-press, a roller by which the bale is formed, a rotary member at each end of said roller, a series of plates for the ends of the bale carried by each of said rotary members, and bale-spindle-engaging devices upon said end plates, the end plates and bale-spindle-engaging devices having a motion longitudinal of the bale-spindles, a bale-spindle holder arranged in the path of said bale-spindle-engaging devices, whereby a bale-spindle may be engaged by a pair of said bale-spindle-engaging devices while a bale is being formed by said rollers, and manually-operated means holding the end plates and bale-spindle-engaging devices in position.

29. The combination with a roller baling-press, of a bale-spindle magazine, consisting of an inclined box suitably supported and containing bale-spindles, the lower edge of said box being flexible and having the lower part of the sides thereof cut away, said cutaway part being arranged in the path of the bale-spindle-engaging devices.

30. In a roller baling-press, a bale-covering apparatus, consisting of a roll of suitable material mounted to slide longitudinally of the bale, mechanism propelling the said roll of material longitudinally of the bale as it is rotated, and automatic devices throwing the propelling mechanism out of operation when the roll of material has reached the limit of its travel.

31. In a roller baling-press, a bale-covering apparatus, consisting of a roll of suitable material mounted to slide longitudinally of the bale, mechanism propelling said roll of material longitudinally of the bale as it is rotated, automatic appliances throwing the propelling mechanism out of operation when the roll of material has reached the limit of its travel, and devices holding the propelling mechanism out of operation.

32. In a baling-press, a bale-covering apparatus, consisting of a roll of material mounted in a frame adapted to slide longitudinally of the bale, a rack secured thereto, a gear-wheel adapted to mesh with said rack, a suitable shaft carrying said gear-wheel, mechanism driving the latter, and a spring holding said shaft and gear-wheel in or out of operative relationship with said rack.

33. In a baling-press, a bale-covering apparatus, consisting of a roll of material mounted in a frame adapted to slide longitudinally of the bale, a rack secured thereto, a gear-wheel adapted to mesh with said rack, a suitable shaft carrying said gear-wheel, mechanism for driving the same, an incline at the end of said rack adapted to disengage the gear-wheel from the rack at the limit of its travel, and means holding the gear-wheel out of mesh with the rack.

34. In a baling-press, a set of rollers by which the bale is formed, a second set of rollers by which the bale is completed by the application of the bagging, and a bale-covering apparatus operating in conjunction with the latter set of rollers.

In testimony whereof I have hereunto set my hand and affixed my seal in the presence of the two subscribing witnesses.

ANDREW SCHULZE. [L. S.]

Witnesses:
A. C. FOWLER,
JOHN F. GREEN